July 3, 1945.  A. L. CHAUVET  2,379,787
CONTROLLED BEAM HEADLIGHT LENS
Filed Aug. 3, 1942
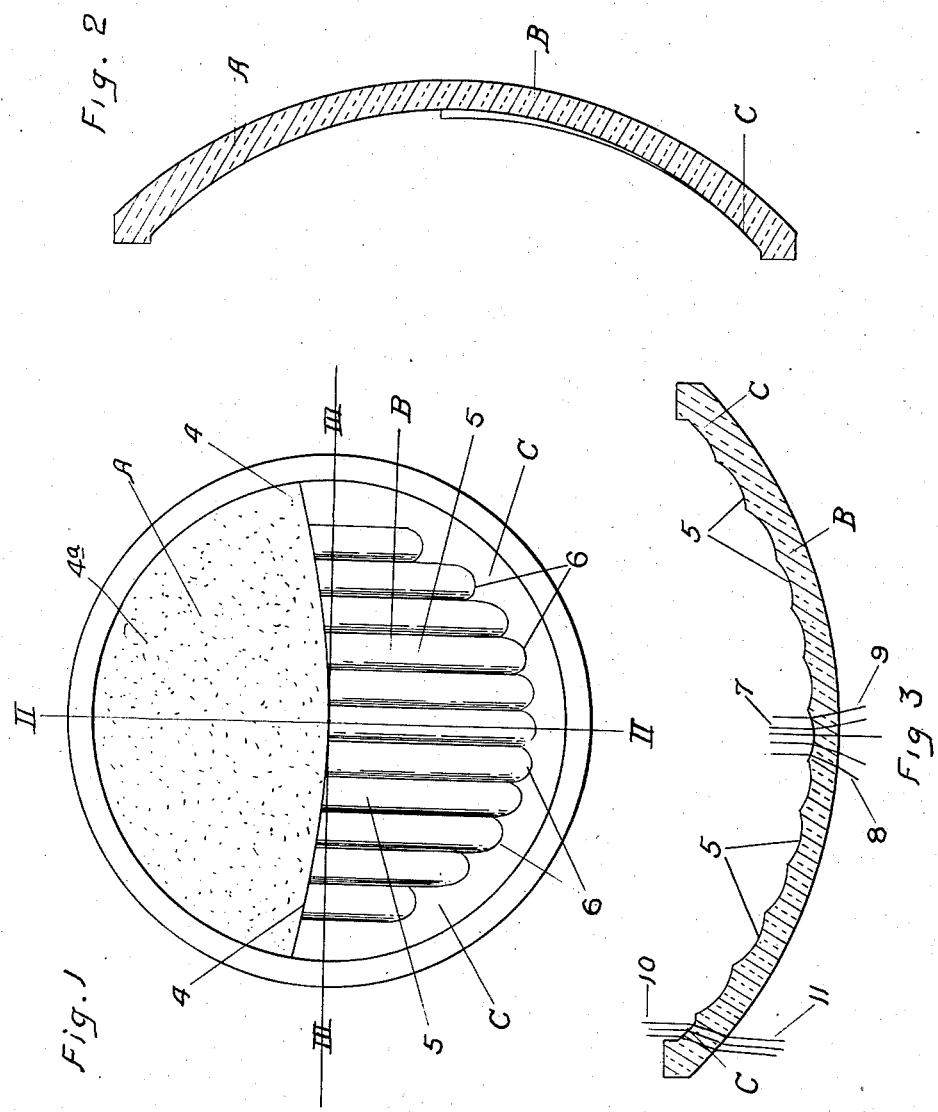
INVENTOR.
ALBERT L. CHAUVET
BY Castberg & Roemer
ATTORNEYS.

Patented July 3, 1945

2,379,787

UNITED STATES PATENT OFFICE 2,379,787

CONTROLLED BEAM HEADLIGHT LENS

Albert L. Chauvet, Piedmont, Calif.

Application August 3, 1942, Serial No. 453,361

2 Claims. (Cl. 240—41.4)

This invention relates to a headlight lens for motor vehicles and the like, and especially to a lens which projects two distinct beams of light and confines the beams to restricted or predetermined areas.

The object of the present invention is generally to improve and simplify the construction and operation of headlight lenses, to provide a lens which will provide sufficient illumination for safe driving under all conditions and at the same time protect approaching motorists by eliminating glare and dazzling rays which interfere with vision and safe driving. The invention more specifically stated embodies a lens which is divided into three areas or regions, to wit, an upper half area which is rendered opaque or only slightly translucent, and a lower half area, the central portion of which projects a refracted beam of light and projects it both ahead and laterally to illuminate the sides of the road, and a surrounding portion which projects a forward central substantially unobstructed beam of light to illuminate the road area directly ahead of a vehicle.

The lens is shown by way of illustration in the accompanying drawing, in which:

Fig. 1 is a view showing the interior surface of the headlight lens,

Fig. 2 is an enlarged cross section taken of line II—II of Fig. 1; and

Fig. 3 is an enlarged cross section taken of line III—III of Fig. 1.

Referring to the drawing in detail, it will be seen that a lens is shown, the body portion of which may be termed a convex diverging lens, as the outer surface is convex and the inner surface is concave, but the radius of the inner surface is smaller than that of the convex outer surface; hence, a lens body is produced which is thinnest in the center and increases gradually in thickness toward the outer peripheral edge, thus providing a lens body which causes dispersion of light rays when passing therethrough. The total surface of the lens is divided into three distinct regions or areas which have three different functions to perform and the results produced depends upon the proper positioning and proportioning of these areas with relation to each other. The three regions or areas referred to are indicated at A, B and C.

Region A occupies the upper part of the lens as defined by the line 4, and is rendered opaque by shielding or painting, or semi-translucent for instance by sanding as indicated at 4a with the object of totally obstructing or at least greatly reducing the luminous rays transmitted through that area of the lens. The region B is a light refracting area, as a series of vertically disposed parallel flutes or grooves 5 are formed thereon, the inner surfaces of which are concave thereby causing spreading of luminous light rays 7 as indicated at 8 and 9. The flutes diminish in depth toward the outer edges of the lens and terminate at the points indicated at 6, thereby leaving a surrounding of narrow, clear unobstructed region or area C through which luminous rays such as indicated at 10 are permitted to freely pass, but as the body of the lens gradually increases in thickness from the center to the outer peripheral edge a slight bending of these rays in an outward direction takes place as indicated at 11. The outward bending, while exaggerated on the drawing, is only slight as the purpose is to direct a strong beam of light directly on the road a suitable distance ahead of a vehicle, this beam is intensified by the refracted light emanating from the region B and in addition thereto region B illuminates the sides of the road, thus the light projected forward is controlled as it is confined to certain predetermined areas. Region A extinguishes or interrupts glare producing rays as well as rays which would be projected skyward and serve no useful purpose. Experiments indicate that cutting off of these rays reduces but slightly the effective and necessary rays for highway illumination. By properly regulating the depth of this area and the curve 4 of its lower edge, it is possible to make glare invisible from points ahead or at the sides of the car above the level of this edge. Region A can also be utilized to display monograms, insignia, etc., useful for novel purposes as translucent designs on a dark or opaque background may be made. By making this region opaque and of proper dimensions, all the necessary rays can be suppressed and the illumination confined strictly to the pavement, an important feature for military purposes.

In actual practice it will be understood that the lens may be applied to any standard headlight employing a parabolic or like reflector whether it be of the sealed beam type or otherwise and that while these and other features of the invention have been more or less specifically described, it should be understood that changes may be resorted to within the scope of the appended claims.

Having thus described my invention, what I claim and desire to secure by Letters Patent is:

1. A circular headlight lens of the character described presenting an outer convex surface and an inner concave surface, said lens having substantially its upper half portion treated to retard the passing of light rays therethrough, a continuous series of substantially parallel vertically disposed concave flutes formed in the inner face of the lower half surface of the lens to refract rays passing therethrough and covering the major portion of the lower half of the lens, said flutes terminating at their lower ends short of the peripheral edge of the lens, leaving a narrow unobstructed arcuate peripheral area throughout substantially the lower half of the lens between said lower ends of the flutes and the peripheral edge of the lens and permitting free passage of light rays therethrough.

2. A circular headlight lens of the character described presenting an outer convex surface and an inner concave surface (and increasing in thickness from the center towards the outer peripheral edge to cause dispersion of light rays passing therethrough, said lens having substantially its upper half portion treated to retard the passing of light rays therethrough, a continuous series of substantially parallel vertically disposed concave flutes formed in the inner face of the lower half surface of the lens to refract rays passing therethrough and spread them laterally, said flutes terminating at their lower ends short of the peripheral edge of the lens, leaving a narrow unobstructed arcuate peripheral area throughout substantially the lower half of the lens located between said lower ends of the flutes and the peripheral edge of the lens and permitting free passage of light rays therethrough and having radially curved inner and outer faces forming continuations of the convex and concave surfaces of the lens and partaking of the taper in thickness of the lens to bend the light rays outwardly, the upper ends of the flutes being extended at each side of the center above the horizontal plane of the axis of the lens and terminating in a concave arc.

ALBERT L. CHAUVET.